United States Patent
Gradu

(10) Patent No.: US 7,422,537 B2
(45) Date of Patent: Sep. 9, 2008

(54) TORQUE SPLIT HYDRAULIC COUPLING BETWEEN TRANSMISSION AND SECONDARY DRIVING AXLE WITH TORQUE MODULATION AND LOCKING CAPABILITIES

(75) Inventor: Mircea Gradu, Massillon, OH (US)

(73) Assignee: The Timken Company, Canton, OH (US)

(*) Notice: Subject to any disclaimer, the term of this patent is extended or adjusted under 35 U.S.C. 154(b) by 243 days.

(21) Appl. No.: 10/522,965

(22) PCT Filed: Jul. 10, 2003

(86) PCT No.: PCT/US03/21831

§ 371 (c)(1),
(2), (4) Date: Jul. 29, 2005

(87) PCT Pub. No.: WO2004/011295

PCT Pub. Date: Feb. 5, 2004

(65) Prior Publication Data

US 2006/0166775 A1    Jul. 27, 2006

Related U.S. Application Data

(60) Provisional application No. 60/401,111, filed on Aug. 5, 2002, provisional application No. 60/400,383, filed on Jul. 31, 2002.

(51) Int. Cl.
*F16H 37/08* (2006.01)

(52) U.S. Cl. .............. 475/201; 475/211; 475/257; 475/302; 475/329; 192/39; 192/43.1; 192/44

(58) Field of Classification Search ............ 475/119, 475/151, 201, 208, 211, 212, 213, 215, 218, 475/219, 257, 302, 329; 192/38, 39, 43, 192/43.1, 44
See application file for complete search history.

(56) References Cited

U.S. PATENT DOCUMENTS

| 4,185,723 | A | * | 1/1980 | Kelbel | 192/36 |
| 4,503,927 | A | * | 3/1985 | Hayakawa et al. | 180/247 |
| 5,083,986 | A | * | 1/1992 | Teraoka et al. | 475/86 |
| 5,247,443 | A | * | 9/1993 | Gilliam | 701/81 |
| 5,469,950 | A |   | 11/1995 | Lundstrom et al. | |
| 5,890,983 | A | * | 4/1999 | Kawahara et al. | 475/149 |
| 5,992,592 | A | * | 11/1999 | Showalter | 192/43.1 |
| 6,409,001 | B1 | * | 6/2002 | Kerr | 192/44 |
| 6,645,108 | B1 | * | 11/2003 | Gradu | 475/151 |
| 6,679,799 | B2 | * | 1/2004 | Bowen | 475/5 |
| 6,712,728 | B2 | * | 3/2004 | Gradu | 475/152 |
| 6,712,730 | B2 | * | 3/2004 | Gradu | 475/218 |
| 6,755,762 | B2 | * | 6/2004 | Gradu | 475/150 |

FOREIGN PATENT DOCUMENTS

DE    3533142    10/1986

* cited by examiner

*Primary Examiner*—David D. Le
(74) *Attorney, Agent, or Firm*—Polster, Lieder, Woodruff & Lucchesi, L.C.

(57) ABSTRACT

A power transmission system coupling (100) configured to provide a responsive and controllable clutch (110) using a torque split arrangement including a planetary gear set (106) for torque modulation, together with a locking device (134) to maximize torque transfer capability when modulation is not required.

21 Claims, 6 Drawing Sheets

TORQUE SPLIT HYDRAULIC COUPLING BETWEEN TRANSMISSION AND SECONDARY DRIVING AXLE WITH TORQUE MODULATION AND LOCKING CAPABILITIES

CROSS-REFERENCE TO RELATED APPLICATIONS

The present invention is related to, and claims priority from U.S. Provisional Patent Application No. 60/400,383 filed on Jul. 31, 2002, and is related to, and claims priority from U.S. Provisional Patent Application No. 60/401,111 filed on Aug. 5, 2002.

TECHNICAL FIELD

The present invention relates generally to vehicle power transmission systems coupled between a driving motor and one or more driven vehicle wheels, and in particular, to a power transmission system torque coupling configured to provide a responsive and controllable clutch using a torque split arrangement including a planetary gear set for torque modulation, together with a locking device to maximize torque transfer capability when modulation is not required.

BACKGROUND ART

Most light automotive vehicles, such as automobiles, sport-utility vehicles, vans and light trucks, have four wheels, but in the typical vehicle the driving engine which propels the vehicle is coupled to only two of the wheels. In older vehicles the rear wheels normally propelled the vehicle, but in newer vehicles it is commonly the front wheels. Light trucks and off-road vehicles commonly have four-wheel drive (4WD), the famous U.S. Army Jeep for example, but often operate with power delivered to only two wheels. If the need arises for more traction, the transmission output is coupled with the other two wheels through a manually operated transfer case. The rear and front wheels share the torque delivered by the driving engine under a fixed gear ratio.

In recent years automotive manufacturers have produced more sophisticated vehicles with all wheel drive (AWD). In the typical vehicle of this type, all four wheels normally drive the vehicle with the engine torque split between the front and rear wheels. The driving engine delivers power through a transmission which is in turn connected directly to two of the wheels, referred to as the primary driving wheels. The remaining two wheels, referred to as the secondary driving wheels, are connected to the transmission through a torque coupling which accommodates slight variations in speed between the primary and secondary wheels.

While a differential is commonly interposed between the primary driving wheels and the transmission, the connection is considered "direct" in the sense that no slippage can develop between the primary wheels and the transmission. While a second differential is commonly interposed between the torque coupling and the secondary wheels, the connection is "indirect" as the torque coupling allows for slippage between the secondary wheels and the transmission. The torque coupling operates to divides the torque between the primary and secondary wheels.

Torque couplings are used in four-wheel-drive or all-wheel-drive applications to transfer torque to the secondary axle or to provide a limited slip differential function between a pair of wheels on a single axle under operating conditions where one wheel on the axle looses traction. An essential characteristic of a torque coupling is the capability of modulating the torque delivered by the driving engine, in order to improve vehicle handling, safety, and acceleration performance, even under no-wheel-slip conditions and at higher vehicle speeds. There are basically two functions to be performed by a torque coupling in a four-wheel or all-wheel drive application. First, traction enhancements at low speed and high torque operating conditions, and second, vehicle dynamic control at high speed and low torque operating conditions.

One type of torque coupling is a hydraulic coupling. Hydraulic couplings consist essentially of a wet-plate clutch and a pumping mechanism supplying pressure required for the clutch actuation.

Usually, as is shown in U.S. Pat. No. 5,595,214 to Shaffer et al., and in U.S. Pat. No. 5,469,950 to Lundström et al., the pumping mechanism is of the gerotor or geared pump type, or the piston/axial cam type, and is configured to take advantage of the differential speed resulting from slip between either a pair of axles of the vehicle, or between each wheel on a common axle, to provide the pressure to actuate the clutch.

The overall coupling responsiveness depends upon the speed with which the hydraulic pressure is created and how rapidly the pressure can be applied to the clutch. As is well known, the hydraulic fluid volume flow achieved by the pumping mechanism and the directly proportional hydraulic fluid pressure differential each depend on the relative speed between the pumping mechanism components.

Accordingly, it would be desirable to provide a coupling device, such as a hydraulic coupling, with improved responsiveness for torque modulation, and which is capable of maximizing torque transfer from the drive motor to the driven components when torque modulation is not required.

SUMMARY OF THE INVENTION

Briefly stated, a torque coupling of the present invention includes a clutch and a planetary set connected such that two torque-transfer paths exist through the coupling, a mechanical path and a clutch path. An improved responsive and controllable clutch in the clutch path accommodates slippage in the torque coupling and controls the amount of torque transferred in each of the paths. A locking device in the clutch path is configured to maximize the torque transfer capability through the mechanical path of the torque coupling when torque modulation through the clutch path is not required. The proportion of torque transmitted through the mechanical path in comparison to the torque transmitted through the clutch path is determined by the design of the planetary set and the associated planetary gear ratios.

In an additional embodiment of the present invention, the torque coupling is a hydraulic torque coupling and is further configured with a pumping mechanism and a wet plate clutch.

In an additional embodiment of the present invention, the torque coupling is a hydraulic torque coupling and is further configured with a gear pump and a wet plate clutch.

In an additional embodiment of the present invention, the torque coupling is a hydraulic torque coupling and is further configured with a piston pump and a wet plate clutch.

The foregoing and other objects, features, and advantages of the invention as well as presently preferred embodiments thereof will become more apparent from the reading of the following description in connection with the accompanying drawings.

BRIEF DESCRIPTION OF DRAWINGS

In the accompanying drawings which form part of the specification.

Corresponding reference numerals indicate corresponding parts throughout the several figures of the drawings.

BEST MODE FOR CARRYING OUT THE INVENTION

The following detailed description illustrates the invention by way of example and not by way of limitation. The description clearly enables one skilled in the art to make and use the invention, describes several embodiments, adaptations, variations, alternatives, and uses of the invention, including what is presently believed to be the best mode of carrying out the invention.

Figure 1:
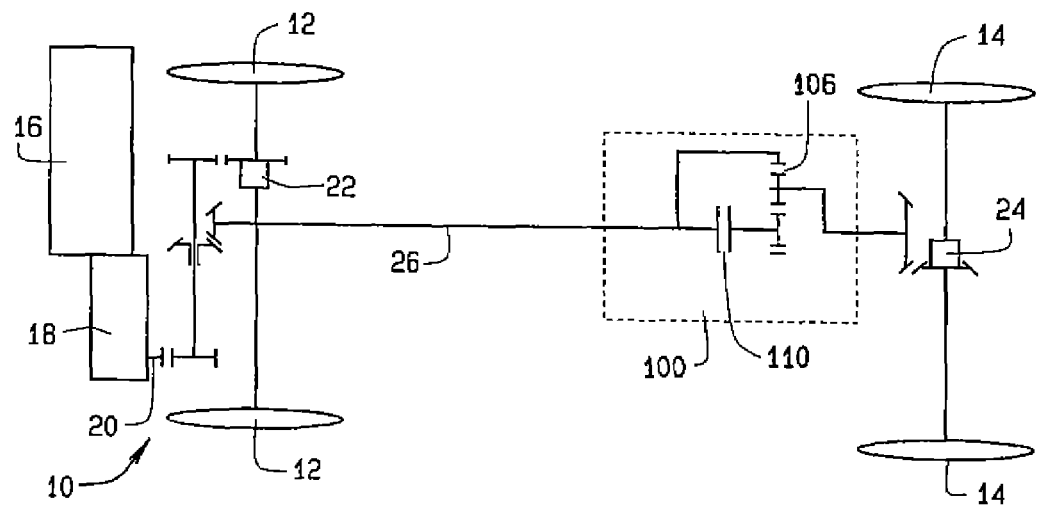
FIG. 1 is a schematic view of a front wheel drive automobile provided with a torque coupling constructed in accordance with and embodying the present invention.

Turning to FIG. 1, an automotive vehicle, such as a passenger car, a sports utility vehicle, a van or even a truck, is shown at 10, and includes a pair of primary driving wheels 12, which are the front road wheels, and pair of secondary driving wheels 14, which are the rear road wheels. A driving engine 16 is provided which is either transversely or longitudinally mounted, and is coupled to a transmission 18 which may be of the automatic type or manual type. The driving engine 16 and transmission 18 constitute a power unit that delivers torque through a transmission output shaft 20, such as the main shaft of the transmission 18. The output shaft 20 of the transmission 18 is connected to the primary driving wheels 12 through a primary differential 22. The connection is direct in the sense that no slippage occurs between the output shaft 20 and the primary wheels 12.

The output shaft 20 of the transmission 18 is also connected to the secondary driving wheels 14 through a torque coupling 100 of the present invention and a secondary differential 24, but the connection is indirect, inasmuch as the torque coupling 100 accords a measure of slippage between the secondary wheels 14 and the transmission shaft 20 and likewise between the secondary wheels 14 and the primary wheels 12. The slippage accommodates small variations in velocity between the primary and secondary wheels 12 and 14, changes which may be occasioned by variances in tire size or by negotiating turns. Preferably the torque coupling 100, is located at or close to the primary differential 22 and is connected to the output shaft 20 of the transmission 18 through a drive shaft 26 which extends longitudinally through the vehicle 10.

Figure 2:
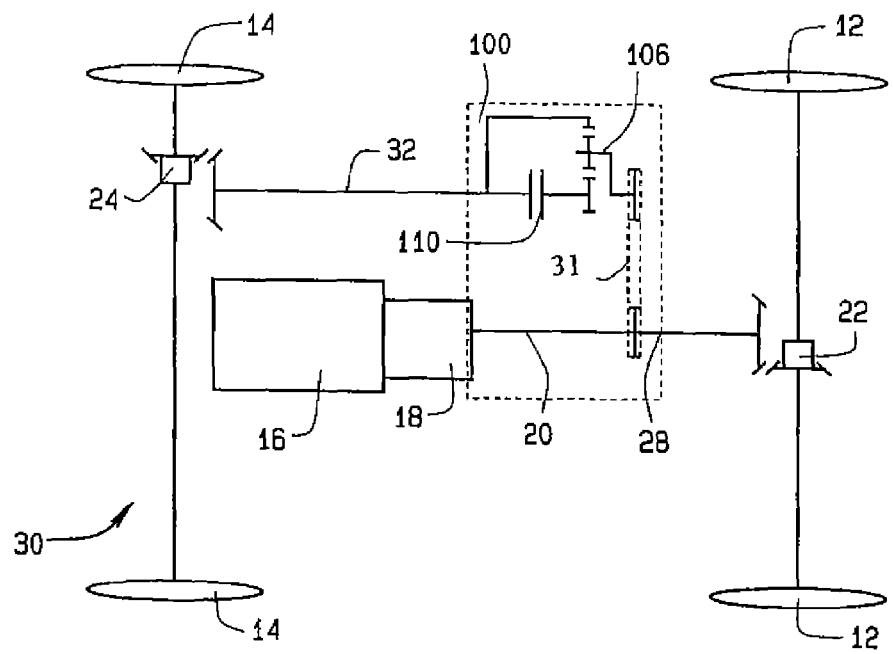
FIG. 2 is a schematic view of a rear wheel drive automobile provided with the torque coupling.

Turing to FIG. 2, an alternate automotive vehicle 30 is shown with essentially the same components as the vehicle 10, except that they are organized differently. In vehicle 30 the primary driving wheels 12 and primary differential 22 are at the rear of the vehicle, whereas the secondary driving wheels 14 and the secondary differential 24 are at the front of the vehicle. The driving engine 16 and transmission 18, while being at the front of vehicle 30, are mounted longitudinally. The output shaft 20 of the transmission 18 and the primary differential 22 are connected through a primary drive shaft 28. The torque coupling 100 is connected to the transmission output shaft 20 through a chain 31, and the torque coupling 100 is, in turn, connected to the secondary differential 24 through a secondary drive shaft 32.

Each vehicle 10, 30 possesses a variety of sensors which produce electrical signals that reflect the conditions under which the vehicle operates, and those signals are fed to an onboard microprocessor which evaluates them and produces a signal that controls the torque coupling 100. The torque coupling 100 is responsive to the signals to apportion the torque delivered at the output shaft 20 of the transmission 18 between the primary driving wheels 12 and the secondary driving wheels 14 to enable the vehicle to best respond to the driving conditions monitored by the sensors. Among the driving conditions monitored may be angular velocity of each of the wheels 12 and 14, longitudinal acceleration, lateral acceleration, torque delivered at the output shaft 20 of the transmission 18, position of the throttle for the driving engine 16, and position of the steering gear (steering angle).

Figure 3:
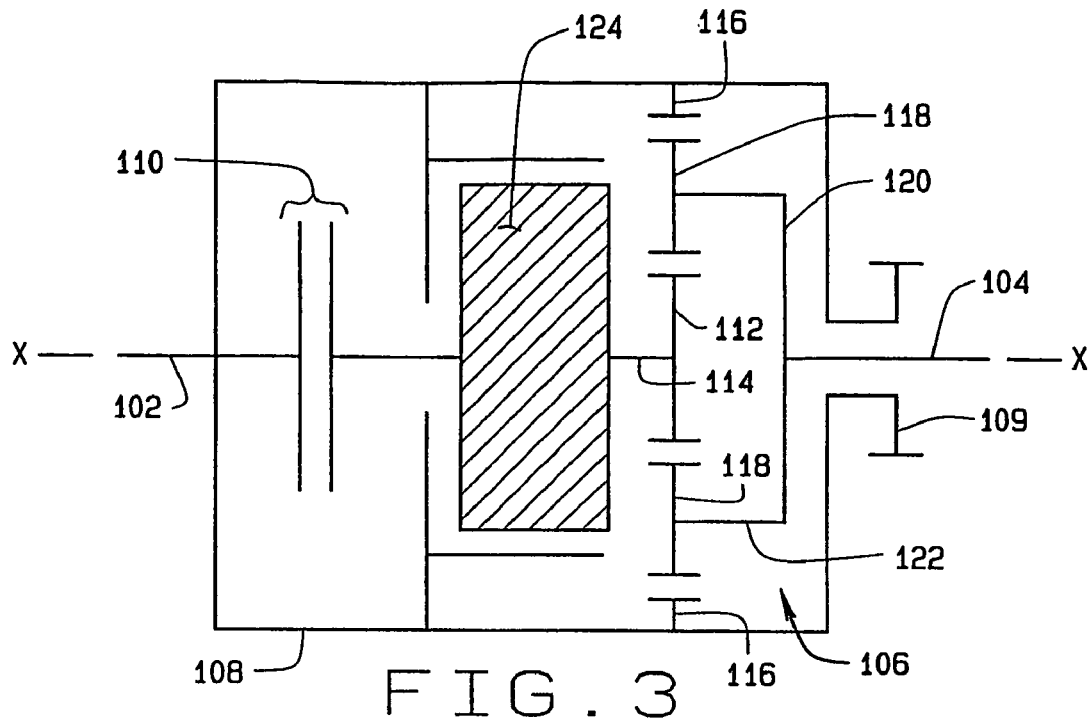
FIG. 3 is a simplified sectional view of a hydraulic torque coupling of the present invention configured with a pumping mechanism.

The torque coupling 100 apportions the torque delivered at the transmission 18 between the primary driving wheels 12 and the secondary driving wheels 14 to best satisfy the conditions under which the vehicle operates at the time. As shown in FIG. 3, the torque coupling 100 includes an input member or shaft 102 connected to the shaft 20 of the transmission 18, and an output member or shaft 104 connected to the secondary differential 24. The two shafts 102 and 104 rotate about a common axis X. The torque coupling 100 further includes a planetary gear set 106 contained within a housing 108, and which is organized about the axis X. An optional output gear 109 is coupled directly to the housing 108, co-axial with the output shaft 104, to provide a second output path for the torque coupling 100. The planetary gear set 106 is connected to both the input and output shafts 102 and 104. Finally, the torque coupling 100 includes a clutch 110 that is also located around the axis X, adjacent the input shaft 102 to the planetary gear set 106, such that torque is transferred between the input shaft 102 and planetary gear set 106 with slippage.

The torque coupling 100 provides two torque transfer paths between the input shaft 102 and the output shaft 104. The first torque transfer path is a purely mechanical path that passes from the input shaft 102, to the housing 108, and through the planetary gear set 106 to the output shaft 104.

The second torque transfer path is a clutch path which passes from the input shaft 102, through the clutch 110 and the planetary gear set 106, to the output shaft 104. The majority of the transmitted torque passes through the torque coupling 100 over the mechanical path, which is referred to as the high torque path. The clutch path functions as the low torque path.

The planetary gear set 106 includes a sun gear 112 having a stub shaft 114 extended from it into the clutch 110. It also includes a ring gear 116 to which the input shaft 102 is coupled through the housing 108. A portion of the housing 108 is coupled to the input shaft 102, and is disposed in operative relationship with the ring gear 116. In addition, the planetary gear set 106 has planet gears 118 that are located between the sun gear 112 and ring gear 116 and engage both. Finally, the planetary gear set 106 has a carrier 120 provided with spindles 122 on which the planet gears 118 rotate. The carrier 120 is connected directly to the output shaft 104. The gears 112, 116, and 118 together with the carrier 120 constitute elements of the planetary set 106.

In the operation of the vehicle, the driving engine 16 generates torque which is transferred through transmission 18, which has the capacity to alter the torque, so that the torque delivered at the shaft 20 of the transmission 18 may be different from that delivered by the driving engine 16. A portion of the torque at the transmission shaft 20 is delivered to the primary driving wheels 12 through the primary differential 20 without any slippage between the wheels 12 and the transmission shaft 20. The remaining torque is delivered to the secondary wheels 14 with some slippage between the transmission shaft 20 and the secondary wheels 14, and that slippage occurs within the torque coupling 100. The total amount of torque delivered at the primary wheels 12 and at the secondary wheels 14 approximately equals the torque in the shaft 20 of the transmission 18, with some losses due to friction between the components.

However, the apportionment of that torque between the primary wheels 12 and the secondary wheels 14 may not be equal, and under most driving conditions is not. The apportionment of torque between the primary wheels 12 and the secondary wheels 14 is dependent on the clutch 110 of the torque coupling 100.

The shaft 20 of the transmission 18, coupled to the input shaft 102 of the torque coupling 100, rotates the input shaft 102 and transfers torque to the input shaft 102. Within the torque coupling 100, the torque splits into two paths and then recombines, so that the torque in the output shaft 104 of the torque coupling 100 essentially equals the torque in the input shaft 102, at least when minimum slippage occurs in the clutch 110. In one path, the mechanical path, the torque passes from the input shaft 102 to the housing 108, and on to the ring gear 116 of the planetary gear set 106. From the ring gear 116, the torque is passed through the planet gears 118 to the planet carrier 120, and finally to the output shaft 104. For the other path, the clutch path, the torque passes from the input shaft 102 to the clutch 110, then to the sun gear 112 of the planetary set 106 through its stub shaft 114. From the sun gear 112, the torque is passed to the planet gears 118 and finally through the carrier 120 to the output shaft 104. The hookups between the planetary gear set 106 and the clutch 110 are such that the mechanical path transfers more torque than the clutch path.

The division of torque between the two paths depends on the gear ratio U between the ring gear 116 and the sun gear 112, which is a function of the number of teeth on the ring gear 116 versus the number of teeth on the sun gear 112. The higher the ratio U, the less the amount of torque transferred through the clutch path and conversely the more torque transferred through the mechanical path. Preferably, most of the torque transferred through the torque coupling 100 passes through the mechanical path and relatively little through the clutch path, thereby permitting a downsizing of the clutch 110.

A reduction of force exerted on clutch 110 will reduce the torque transmitted through the clutch path, and that in turn will reduce the total torque delivered through the output shaft 104 to the secondary wheels 14. Since the torque in the output shaft 104 generally equals the torque in the input shaft 102, a lesser amount of torque is diverted from the shaft 20 of the transmission 18 to the input shaft 102 of the torque coupling 100, leaving a greater amount to be transferred to the primary driving wheels 12. Conversely, when the force exerted on the clutch 110 increases, the clutch 110 transfers more torque which translates in more torque in the clutch path and a proportionally greater torque at the output shaft 104, and at the input shaft 102 as well. The greater demand for torque by the input shaft 102 leaves less torque for the primary drive wheels 12. Thus, the amount of force applied to the clutch 110 determines the proportion of the total torque at the transmission shaft 20 which is diverted through the torque coupling 100 and that is of course the amount of torque delivered to the secondary wheels 14. The remaining torque from the transmission shaft 20 goes to the primary wheels 12.

In short, the force applied to the clutch 110 controls the division of torque between primary wheels 12 and the secondary wheels 14, and that force, together with the amount of slippage in the clutch 110 and other variables, such as temperature, controls the amount of torque transferred through the clutch 110. The clutch 110 experiences some slippage under typical driving conditions, with the input shaft 102 rotating slightly faster than the output shaft 104, but the difference in angular velocities is not substantial and produces only a very small dissipation of power.

As shown in FIG. 3, clutch 110 preferably is a wet plate clutch actuated by a conventional pumping mechanism 124 contained within the housing 108 of the torque coupling 100. The pumping mechanism 124 is configured to take advantage of the differential speed resulting under slip between the two axles of the vehicle 10, 30 or between the two wheels on a single axle, to provide pressure to actuate the clutch 110. The volume flow of hydraulic fluid achieved by the pumping mechanism 124 and the directly proportional pressure differentials are dependant upon the relative speed between the pump members. In the torque coupling 100, the relative speed between the pump member is equal to the relative speed between the sun gear 112 and the ring gear 116 in the planetary set 106. This relative speed is further dependant upon the planetary gear ration, and is a multiple of the relative speed between the input shaft 102 and the output shaft 104. Hence, the planetary set 106 provides an amplification effect on the speed between the pump members, which is beneficial for the volume flow and pressure delivered by the pump mechanism 124, thereby reducing the clutch torque requirements.

Figure 4:
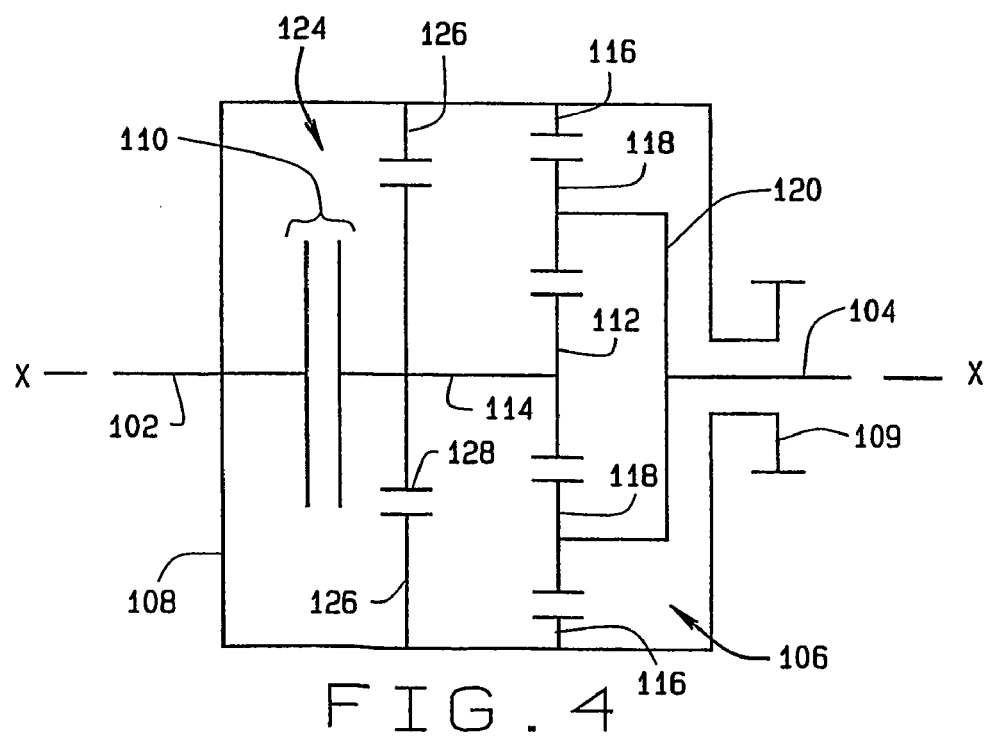
FIG. 4 is a simplified sectional view of an alternate embodiment hydraulic torque coupling of the present invention configured with a gear pump.

In one embodiment, shown in FIG. 4, the pumping members of the pump mechanism 124 consist of an internal gear 126 and an eccentrically mounted external gear 128. Rotation of the external gear 128 about the X-X axis on the eccentric mounting provides a pumping force for the hydraulic fluid and engagement of the clutch 110.

Figure 5:
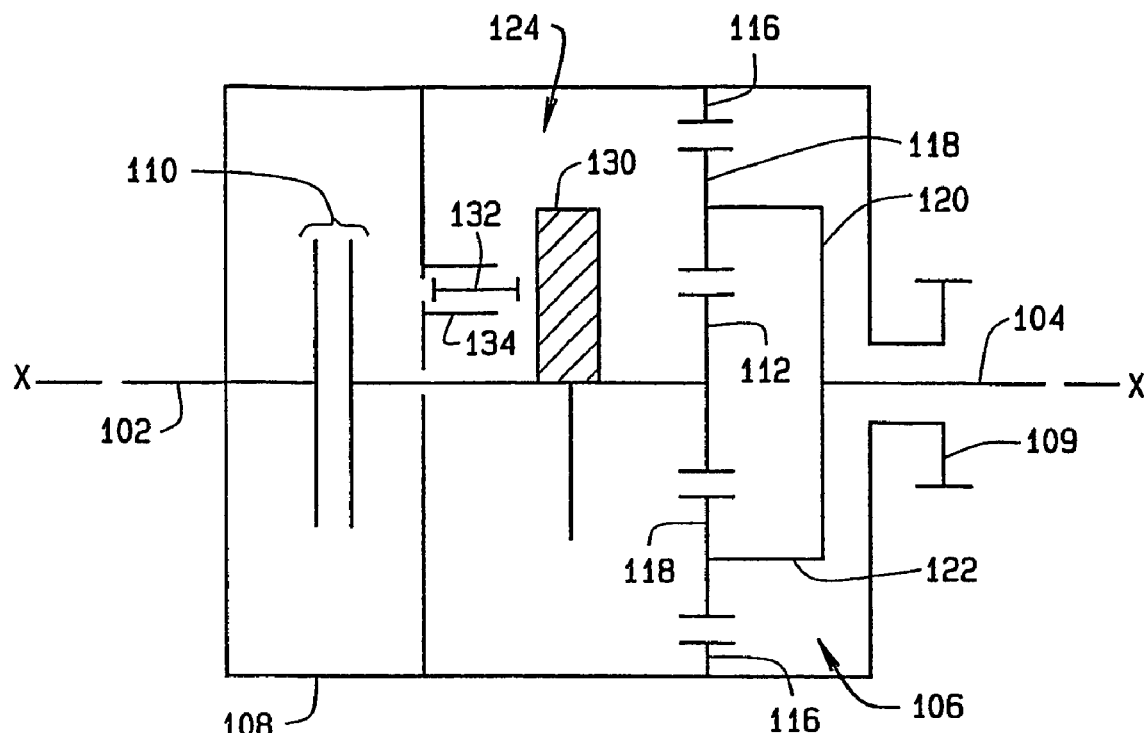
FIG. 5 is a simplified sectional view of an alternate embodiment hydraulic torque coupling of the present invention configured with a piston pump.

In a second embodiment, shown in FIG. 5, the pumping members of the pump mechanism 124 consists of an axial cam plate or swash plate 130 connected to the sun gear 112, and a piston pump 132 disposed in a pump housing 134, connected to the torque coupling housing 108. The axial cam plate or swash plate 130 has a variable thickness around the circumference, and imparts a reciprocating motion parallel to the axis X-X on the piston pump 132 during rotation about the axis X-X. The piston pump 132 provides a pumping force for the hydraulic fluid and engagement of the clutch 110.

Turning to FIGS. 6 through 9, a locking mechanism 134 is shown disposed within the torque coupling housing 108. The locking mechanism 134 is configured to maximize the torque transferred between the input shaft 102 and the output shaft 104 of the torque coupling 100 when the clutch 110 is not being utilized to modulate the torque transfer characteristics.

Figure 6:
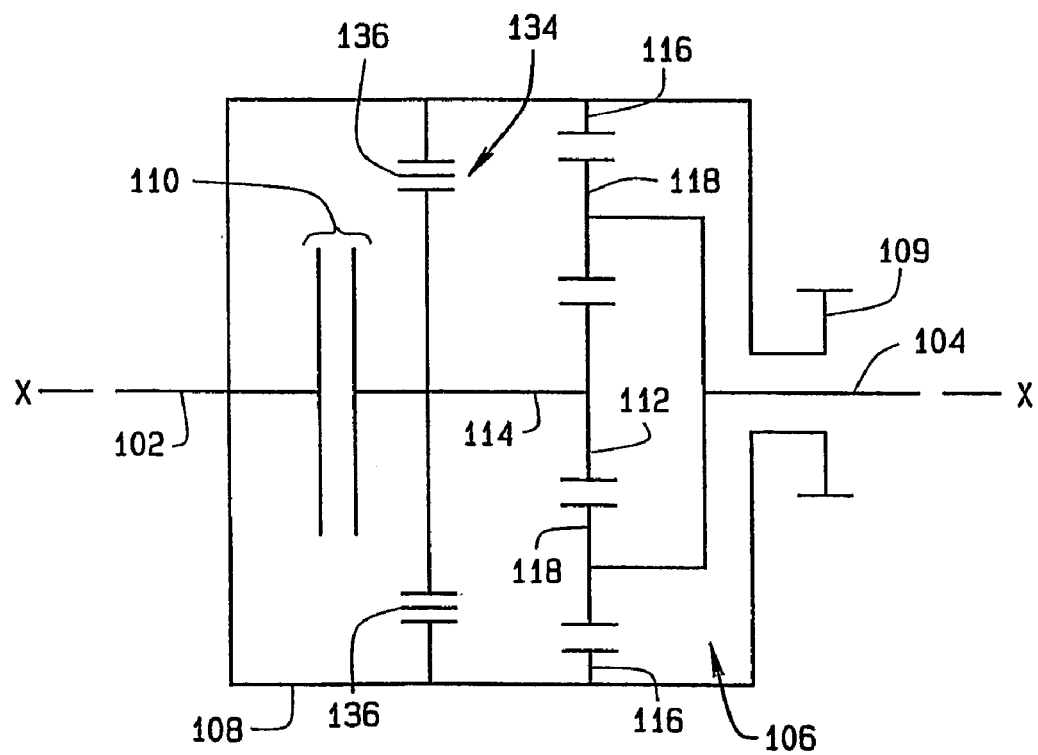
FIG. 6 is a simplified sectional view of a torque coupling of the present invention configured with a locking device disposed between the sun gear and ring gear.
Figure 7:
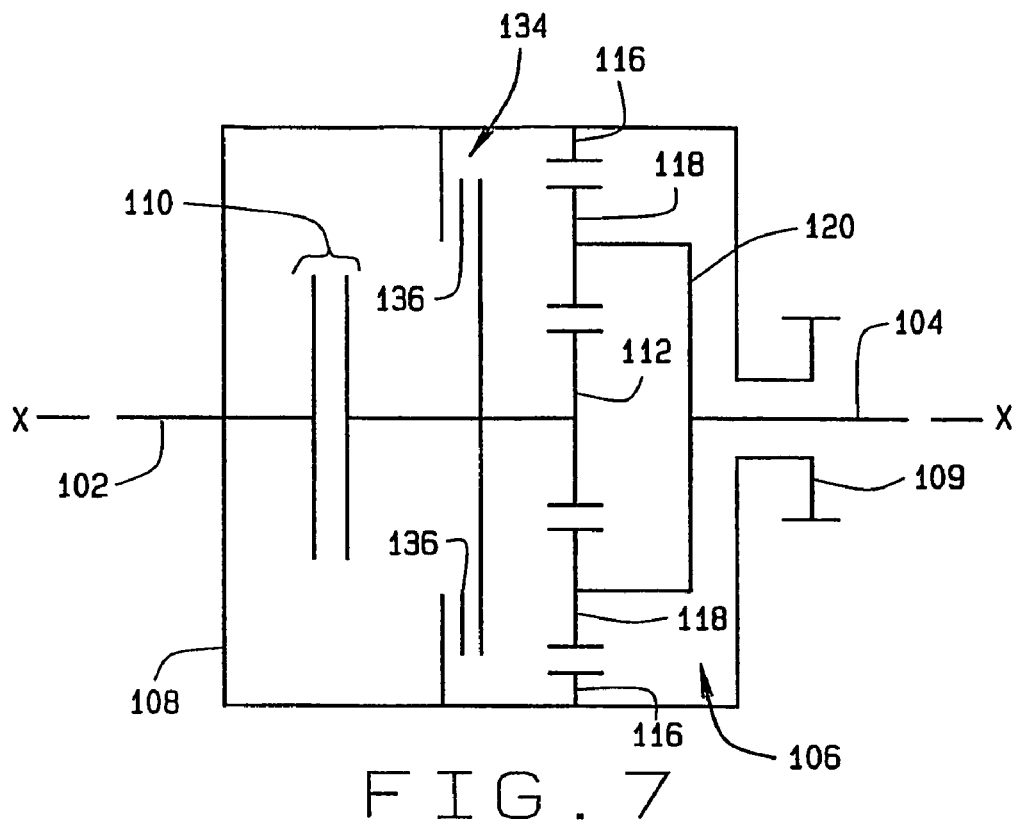
FIG. 7 is a simplified sectional view similar to FIG. 6 with an alternate configuration locking device disposed between the sun gear and ring gear.

The locking mechanism 134 may be placed in parallel with the torque modulation clutch 110, as shown in FIGS. 6 and 7. In FIG. 6, the locking mechanism consists of a roller, sprag, or strut controlled bi-directional clutch 136 disposed between the sun gear 112 and the torque coupling housing 108 upon which the ring gear 116 is fixed. As shown in FIG. 6, the bi-directional clutch 136 may be disposed to operate radially from the axis X-X, or, as shown in FIG. 7, the bi-directional clutch 136 may be disposed to operate co-axially with the axis X-X. When the locking mechanism 134 is disposed between the sun gear 112 and the ring gear 116, the locking mechanism 134 experiences torque and speed conditions similar to the ones on the torque modulating clutch 110. Therefore, the torque capacity requirements for the locking mechanism 134 are significantly reduced for the same reasons as they are for the torque modulating clutch 110. At vehicle low speed and high torque, the torque modulating clutch 110 is disengaged, while the locking mechanism 134 is engaged for maximum torque transfer through the mechanical path. At vehicle higher speeds and lower torque, the locking device is disengaged and the torque transfer is controlled exclusively through the modulation of the torque modulating clutch 110.

Figure 8:
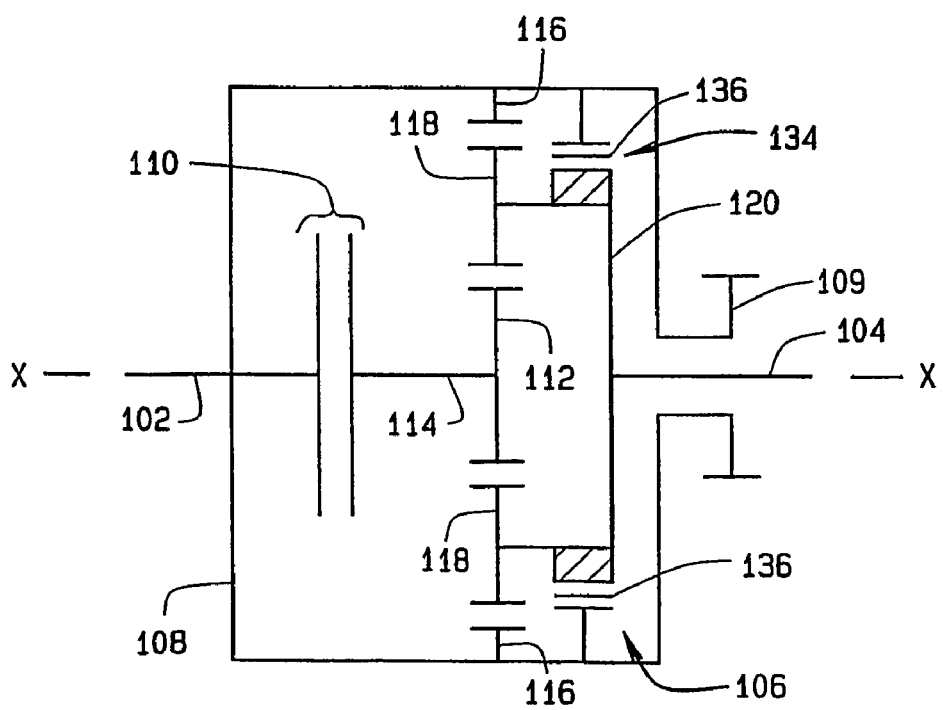
FIG. 8 is a simplified sectional view of a torque coupling of the present invention configured with a locking device disposed between the planet carrier and ring gear.
Figure 9:
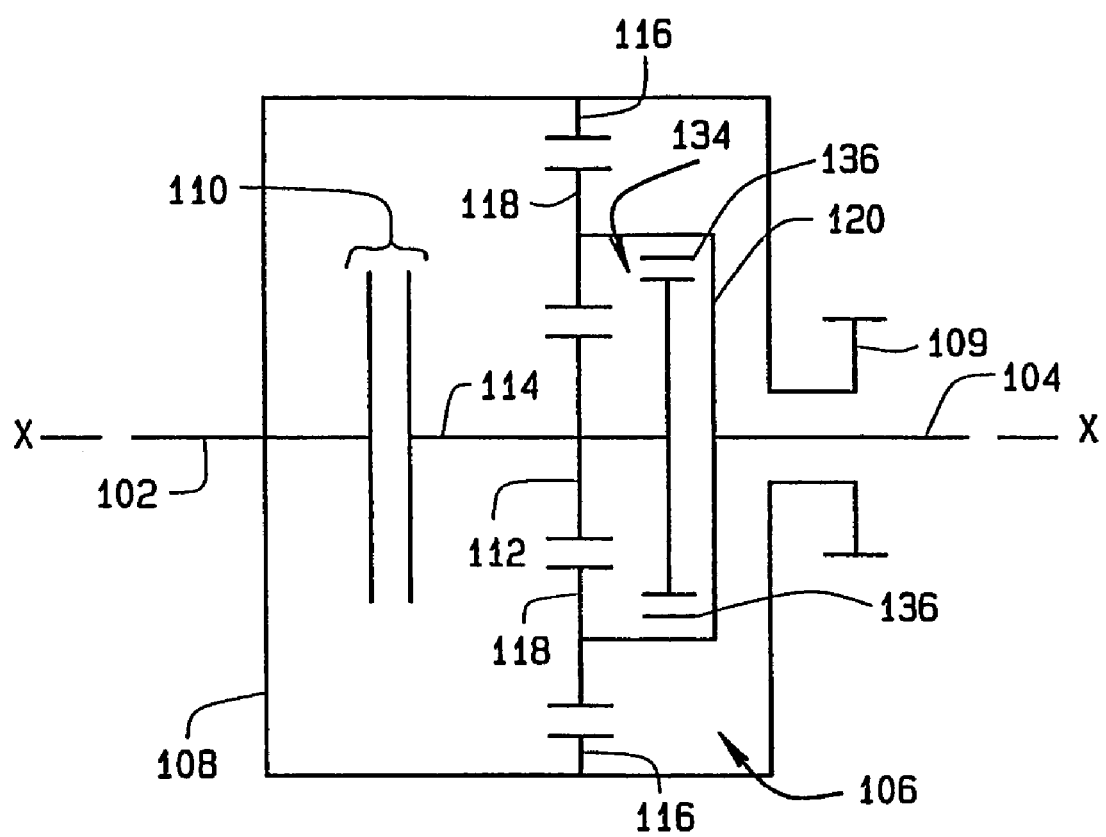
FIG. 9 is a simplified sectional view of a torque coupling of the present invention configured with a locking device disposed between the sun gear and planet carrier.

In alternate embodiments, the locking mechanism 134 is disposed between other members of the planetary gear set 106. For example, as shown in FIG. 8, the locking mechanism is disposed between the torque coupling housing 108 on which the ring gear 116 is disposed and the planet carrier 120 of the planetary gear set 106. This configuration provides is the effective equivalent to locking the input shaft 102 with the output shaft 104 when the locking mechanism 134 is engaged. In a second alternate embodiment, shown in FIG. 9, the locking mechanism 134 is disposed between the sun gear 112 and the planet carrier 120 of the planetary gear set 106.

Figure 10:
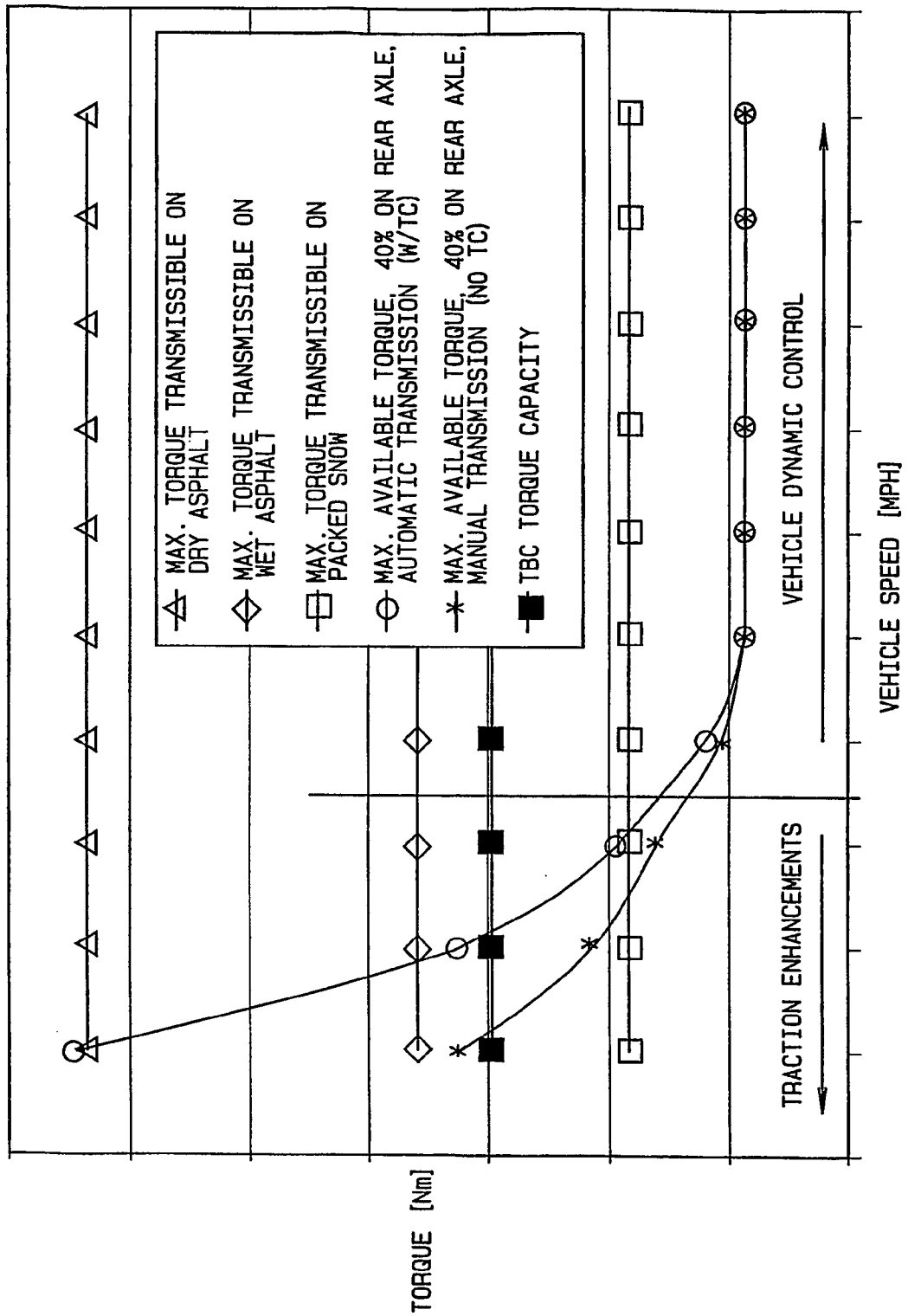
FIG. 10 is a plot of torque versus vehicle speed for a variety of vehicle operating conditions and configurations.

Overall, the torque transmission capacity of the torque coupling 100 need not be equal to the maximum torque output of the driving engine 16 or transmission 18. Rather, as illustrated in FIG. 10, the torque capacity of the torque coupling 100 may be significantly lower than the maximum torque output of the driving engine 16 or transmission 18, resulting in a lighter and less expensive construction. Different road conditions serve to limit the maximum torque which can be delivered to a driven vehicle wheel before wheel slippage will occur. For dry pavement conditions, the maximum torque is relatively large. As logically expected, the maximum amount of torque which can be delivered to a driven wheel prior to slippage decreases as the pavement becomes wet or snow-covered. As illustrated in FIG. 10, the torque coupling 100 can be constructed to permit a level of torque transmission to the secondary wheels 14 of a vehicle 10 which is slightly below the maximum amount of torque expected for wet pavement conditions, thereby preventing the secondary wheels 14 from slipping simultaneously with the primary driven wheels 12, and enhancing vehicle traction and dynamic control.

Other variations are possible and they may employ the same planetary sets 106, pumping mechanism 124, and locking mechanism 134 with different hookups or even different planetary sets. Irrespective of the hookup or planetary set, the arrangement should split the torque into a mechanical path and a clutch path, with most of the torque passing through the mechanical path, and provide a locking mechanism 134 to maximize torque transfer through the mechanical path when torque modulation on the clutch path is not required. In the same vein, the input shaft 102 and output shaft 104 may be reversed, so that torque is applied to the output shaft 104 and delivered from the input shaft 102. Moreover, the planetary sets 106 need not rely on gearing, but instead on friction surfaces, thus becoming traction devices or drives.

Further, the torque coupling 100 need not be confined to the transfer of torque to the secondary wheels 14 of a vehicle, and may have applications in machinery other than that in automotive vehicles, and even in automotive vehicles may be used in different locations.

In view of the above, it will be seen that the several objects of the invention are achieved and other advantageous results are obtained. As various changes could be made in the above constructions without departing from the scope of the invention, it is intended that all matter contained in the above description or shown in the accompanying drawings shall be interpreted as illustrative and not in a limiting sense.

The invention claimed is:

1. A multi-path torque coupling comprising:
   an input shaft adapted to be connected to a source of torque;
   an output shaft from which torque is delivered, said input shaft and said output shaft having a common axis of rotation;
   a wet-plate clutch having first and second clutch members capable of rotating at different angular velocities, said wet-plate clutch configured for transferring torque between said first and second clutch members when engaged, said first clutch member being connected to said input shaft;
   a pumping mechanism configured to engage said first and second clutch members of said wet-plate clutch responsive to said first and second clutch members rotating at different angular velocities;
   a planetary set including first, second, third, and fourth elements organized about said common axis of rotation, said first element connected to said first clutch member and to said input shaft, said second element connected to said second clutch member, said third element connected to said output shaft, and said fourth element connected between said first element and said second element, and between said second element and said third element;
   wherein said input shaft, said wet-plate clutch, said second element, said third element, said fourth element, and said output shaft define a first torque path through said multi-path torque coupling; and
   wherein said input shaft, said first element, said third element, said fourth element, and said output shaft define a second torque path through said multi-path torque coupling.

2. The torque coupling of claim 1 wherein said pumping mechanism is a gear pump, said pumping mechanism including an external gear coupled to said second clutch member and an internal gear coupled to said input shaft.

3. The torque coupling of claim 1 wherein said pumping mechanism includes an axial cam plate coupled to said second clutch member and a piston pump disposed within a pump housing, said piston pump in operative relationship to said axial cam plate.

4. The torque coupling of claim 1 wherein said first element is a ring element located around said common axis; wherein said second element is a sun element which rotates about said common axis; wherein said third element is a carrier element which rotates about said common axis; and wherein said fourth element is a planetary element located between, and engaged with, said sun and said ring elements, said planetary element disposed on said carrier element.

5. The torque coupling of claim 1 wherein the pumping mechanism is a hydraulic pump self contained within the torque coupling and configured to increase and decrease hydraulic pressure responsive to an associated increase and decrease in the difference between the angular velocities of the first and second clutch members, wherein the transferred torque of the clutch is responsive to the increased hydraulic pressure of the pumping mechanism.

6. The torque coupling of claim 1 further including a locking mechanism configured to maximize torque transfer between said input shaft and said output shaft.

7. The torque coupling of claim 6 wherein said locking mechanism consists of a sprag controlled bi-directional clutch.

8. The torque coupling of claim 6 wherein said locking mechanism consists of a strut controlled bi-directional clutch.

9. The torque coupling of claim 6 wherein said locking mechanism is operatively disposed in parallel with said wet-plate clutch, between said first and second elements of said planetary set.

10. The torque coupling of claim 6 wherein said locking mechanism is operatively disposed between said first and third elements of said planetary set.

11. The torque coupling of claim 6 wherein said locking mechanism is operatively disposed between said second and third elements of said planetary set.

12. The torque coupling of claim 6 wherein said locking mechanism consists of a roller controlled bi-directional clutch.

13. A torque coupling comprising:
an input shaft adapted to be connected to a source of torque;
an output shaft from which torque is delivered;
a clutch having first and second clutch members capable of rotating at different angular velocities, said clutch configured for transferring torque between said first and second clutch members when said first and second clutch members rotate at different angular velocities, said first clutch member being connected to said input shaft;
a locking mechanism configured to maximize torque transfer between said input shaft and said output shaft; and
a planetary set including first, second, third, and fourth elements organized about a common axis of rotation, said first element connected to said first clutch member and to said input shaft, said second element connected to said second clutch member, said third element connected to said output shaft, and said fourth element connected between said first element and said second element, and between said second element and said third element.

14. The torque coupling of claim 13 wherein said locking mechanism is further configured to lock said first element and said third element about said common axis of rotation.

15. The torque coupling of claim 13 wherein said locking mechanism is further configured to lock said second element and said third element about said common axis of rotation.

16. The torque coupling of claim 13 wherein said locking mechanism is further configured to lock said first element and said second element about said common axis of rotation.

17. In an automotive vehicle having primary and secondary wheels, a power unit connected directly to the primary wheels, and a torque coupling connected between the power unit and the secondary wheels for apportioning torque between the primary and secondary wheels, said torque coupling comprising:
a torque modulating clutch,
a locking mechanism independent of said torque modulating clutch, and
a planetary set connected such that a locking mechanical path and a separate torque modulating clutch path exist through which torque is transferred between the power unit and the secondary wheels, with the amount of torque transferred through the torque modulating clutch path in relation to the amount transferred through the locking mechanical path being variable by the torque modulating clutch,
whereby the apportionment of torque between the primary and secondary wheels is controlled by the torque modulating clutch and the independent locking mechanism.

18. A multi-path torque coupling for coupling an input shaft adapted to be connected to a source of torque and an output shaft from which torque is delivered wherein the input shaft and said output shaft having a common axis of rotation, the torque coupling comprising:
a wet-plate clutch having first and second clutch members capable of rotating at different angular velocities, said wet-plate clutch configured for transferring torque between said first and second clutch members when engaged, said first clutch member being connected to said input shaft;
a pumping mechanism configured to engage said first and second clutch members of said wet-plate clutch responsive to said first and second clutch members rotating at different angular velocities;
a planetary set including a ring gear, a sun gear, carrier, and a planet gear, each of which is organized about the common axis of rotation, the ring gear is connected to the first clutch member and to the input shaft, the sun gear is connected to the second clutch member, the carrier is connected to the output shaft, the planet gear is connected between the ring gear and the sun gear and is also connected between the sun gear and the carrier,
wherein the clutch, the sun gear, the planet gear and the carrier are configured for providing a first torque path between the input shaft and the output shaft; and
wherein the ring gear, the planet gear and the carrier are configured for providing a second torque path between the input shaft and the output shaft.

19. The torque coupling of claim 18, further comprising a locking mechanism configured to maximize torque transfer between said input shaft and said output shaft through selectively bi-passing the first torque path and the clutch.

20. The torque coupling of claim 19 wherein the locking mechanism is a mechanical coupling of elements selected from the group consisting of the sun gear to the ring gear, the sun gear to the input shaft, the second clutch member to the ring gear, the second clutch member to the input shaft, the carrier to the ring gear, the carrier to the input shaft, the sun gear to the carrier, and the second clutch member to the carrier.

21. A multi-path torque coupling for coupling an input shaft adapted to be connected to a source of torque and an output shaft from which torque is delivered wherein the input shaft and said output shaft having a common axis of rotation, the torque coupling comprising:
means for providing a mechanical clutch control responsive to an amplified difference between an angular velocity of the output shaft and an angular velocity of the input shaft;
means for selectively transferring torque between the input shaft and the output shaft responsive to the provided clutch control; and
means for providing a locking engagement for mechanically transferring torque between the input shaft and the output shaft independent from the means for selectively transferring.

* * * * *